(12) United States Patent
Chi et al.

(10) Patent No.: US 10,668,429 B2
(45) Date of Patent: Jun. 2, 2020

(54) GAS FILTRATION STRUCTURE AND METHOD FOR FILTERING GAS

(71) Applicant: Industrial Technology Research Institute, Hsinchu (TW)

(72) Inventors: Yen-Hsun Chi, Hsinchu (TW); Chun-Ju Huang, Zhubei (TW); Yu-Li Lin, Chiayi (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 90 days.

(21) Appl. No.: 16/008,763

(22) Filed: Jun. 14, 2018

(65) Prior Publication Data

US 2019/0015776 A1 Jan. 17, 2019

Related U.S. Application Data

(63) Continuation-in-part of application No. 15/673,695, filed on Aug. 10, 2017, now abandoned.

(30) Foreign Application Priority Data

Jul. 12, 2017 (TW) .............................. 106123313 A
May 18, 2018 (TW) .............................. 107116992 A (51) Int. Cl.
*B01D 53/22* (2006.01)
*C01B 3/50* (2006.01)
(Continued)

(52) U.S. Cl.
CPC ........... *B01D 53/228* (2013.01); *B01D 63/04* (2013.01); *B01D 71/022* (2013.01); *C01B 3/503* (2013.01);
(Continued)

(58) Field of Classification Search
CPC ...... B01D 53/228; B01D 63/04; B01D 69/10; B01D 69/12; B01D 71/02; B01D 71/022;
(Continued)

(56) References Cited

U.S. PATENT DOCUMENTS 8,652,239 B2 2/2014 Ma et al.
8,900,344 B2 12/2014 Tsai et al.
(Continued)

FOREIGN PATENT DOCUMENTS

CN 101134158 A 3/2008
CN 102105175 A 6/2011
(Continued)

OTHER PUBLICATIONS

Abate et al., "Influence of Zeolite Protective Overlayer on the Performance of Pd Thin Film Membrane on Tubular Asymmetric Alumina Supports", Ind. Eng. Chem. Res., 2016, vol. 55, pp. 4948-4959.
(Continued)

*Primary Examiner* — Jason M Greene
(74) *Attorney, Agent, or Firm* — Birch, Stewart, Kolasch & Birch, LLP (57) ABSTRACT

A method for filtering gas includes providing a gas filtration structure, and the gas filtration structure includes a porous support and a first gas filtration film pair on the porous support, wherein the first gas filtration film pair includes a first hydrogen permeation layer and a first calcinated layered double hydroxide (c-LDH) layer, and the first hydrogen permeation layer is disposed between the porous support and the first c-LDH layer. The method also provides a hydrogen-containing mixture gas over the first gas filtration film pair, and collects hydrogen under the porous support.

15 Claims, 9 Drawing Sheets

(51) Int. Cl.
  *B01D 71/02* (2006.01)
  *B01D 63/04* (2006.01)
(52) U.S. Cl.
  CPC ............ *C01B 3/505* (2013.01); *B01D 71/024* (2013.01); *B01D 2256/16* (2013.01); *B01D 2257/102* (2013.01); *B01D 2257/502* (2013.01); *B01D 2257/504* (2013.01); *B01D 2257/7025* (2013.01); *B01D 2325/028* (2013.01); *B01D 2325/04* (2013.01); *B01D 2325/28* (2013.01); *C01B 2203/0405* (2013.01)
(58) Field of Classification Search
  CPC .............. B01D 71/024; B01D 2256/16; B01D 2325/04; C01B 3/503; C01B 3/505
  See application file for complete search history.

(56) References Cited

U.S. PATENT DOCUMENTS

| | | | |
|---|---|---|---|
| 2004/0129135 A1* | 7/2004 | Roark | B01D 53/228 95/55 |
| 2007/0053811 A1 | 3/2007 | Tsotsis et al. | |
| 2008/0176060 A1 | 7/2008 | Harold et al. | |
| 2009/0297615 A1 | 12/2009 | Wang et al. | |
| 2013/0171442 A1* | 7/2013 | Lin | C23C 18/1216 428/315.5 |
| 2015/0017856 A1 | 1/2015 | Davis et al. | |

FOREIGN PATENT DOCUMENTS

| | | |
|---|---|---|
| CN | 103596671 A | 2/2014 |
| CN | 103657434 A | 3/2014 |
| CN | 105080538 A | 11/2015 |
| EP | 2 735 361 A2 | 5/2014 |
| JP | 2013-139382 A | 7/2013 |
| TW | I442966 B | 7/2014 |
| TW | I449808 B | 8/2014 |

OTHER PUBLICATIONS

Yu et al., "Synthesis of a zeolite membrane as a protective layer on a metallic Pd composite membrane for hydrogen purification", J. Mater. Chem. A., 2015, vol. 3, pp. 5000-5006.
Japanese Office Action, dated Jun. 4, 2019, for Japanese Appliction No. 2018-129997.
Taiwanese Office Action and Search Report, dated Oct. 24, 2018 for Taiwanese Application No. 107116992.

* cited by examiner

GAS FILTRATION STRUCTURE AND METHOD FOR FILTERING GAS

CROSS REFERENCE TO RELATED APPLICATIONS

This application claims priority of Taiwan Application Serial Number 107116992, filed on May 18, 2018. This application is a Continuation-In-Part of pending U.S. patent application Ser. No. 15/673,695, filed on Aug. 10, 2017 and entitled "Membrane and method for filtering gas", which is based on, and claims priority from, Taiwan Application Serial Number 106123313, filed on Jul. 12, 2017 the disclosure of which is hereby incorporated by reference herein in its entirety.

TECHNICAL FIELD

The technical field relates to a purification of hydrogen, and in particular it relates to a gas filtration structure for such purification.

BACKGROUND

The use of gas formed of fossil fuels that can be used for producing hydrogen is one of the most important skills in the generation of hydrogen energy. However, all research and development into fossil fuel-formed gas for producing hydrogen eventually encounters the problem of how to separate impurities from the hydrogen. Pressure-swing absorption, freezing, alloy absorption, and other techniques can be employed to remove these impurities, but these purification methods depend on the nature of the impurities. Although the methods may form filtered hydrogen of high purity, the mechanisms of the methods are complex and expensive. Among such methods, membrane separation used for filtering hydrogen has the advantage of a simple structure, in which the hydrogen permeation layer directly serves as a sieve mesh to separate hydrogen from a mixture gas. However, some compositions (e.g. carbon monoxide, carbon dioxide, and methane) of the mixture atmosphere produced by the reformer are toxic to the hydrogen permeation layer, and these toxic compositions may negatively influence the long-term stability of the hydrogen permeation layer used for purifying the hydrogen. Regarding energy efficiency, the hydrogen-containing gas produced by the reformer (with a hydrogen concentration of about 60% to 70%) and the industrial residual gas (with a hydrogen concentration less than 50%) cannot achieve the substantial benefit. Relevant local manufacturers have found that the low hydrogen concentration of available sources is a major obstruction in the development of practical hydrogen energy and recycling. As such, the membrane for separating and purifying hydrogen should be improved to increase its practicality, and the improvement will be beneficial in promoting the use of hydrogen energy.

SUMMARY

One embodiment of the disclosure provides a gas filtration structure that includes a porous support and a first gas filtration film pair on the porous support. The first gas filtration film pair includes a first hydrogen permeation layer and a first calcinated layered double hydroxide (c-LDH) layer. The first hydrogen permeation layer is disposed between the porous support and the first calcinated layered double hydroxide (c-LDH) layer.

In one embodiment, the porous support includes stainless steel, ceramic, or glass.

In one embodiment, the porous support has pores filled with filling particles, the porous support has a surface modified by another c-LDH layer, or a combination thereof.

In one embodiment, the hydrogen permeation layer 13 includes palladium, silver, copper, gold, nickel, platinum, aluminum, gallium, indium, thallium, germanium, lead, antimony, bismuth, the like, or a combination thereof.

In one embodiment, the first hydrogen permeation layer has a thickness of 1 micrometer to 20 micrometers.

In one embodiment, the layered double hydroxide has a chemical structure of $[M^{II}_{1-x}M^{III}_{x}(OH)_2]A^{n-}_{x/n} \cdot mH_2O$, wherein $M^{II}$ is $Mg^{2+}$, $Zn^{2+}$, $Fe^{2+}$, $Ni^{2+}$, $Co^{2+}$, or $Cu^{2+}$; $M^{III}$ is $Al^{3+}$, $Cr^{3+}$, $Fe^{3+}$, or $Sc^{3+}$; $A^{n-}$ is $CO_3^{2-}$, $Cl^-$, $NO_3^-$, $SO_4^{2-}$, $PO_4^{3-}$, or $C_6H_4(COO^-)_2$; and x is 0.2 to 0.33.

In one embodiment, part or all of $M^{II}$ is replaced with $Li^+$.

In one embodiment, the first c-LDH layer has a thickness of 1 micrometer to 50 micrometers and an interlayer spacing of 2.89 Å to 3.64 Å.

In one embodiment, the first c-LDH layer comprises $CO_3^{2-}$ functional group.

In one embodiment, the gas filtration structure comprises a second gas filtration film pair on the first gas filtration film pair, wherein the second gas filtration film pair includes a second hydrogen permeation layer and a second c-LDH layer, and the second hydrogen permeation layer is disposed between the first c-LDH layer and the second c-LDH layer.

In one embodiment, the first hydrogen permeation layer and the second hydrogen permeation layer have a total thickness of 1 micrometer to 16 micrometers.

One embodiment of the disclosure provides a method for filtering gas, comprising: providing a gas filtration structure. The gas filtration structure includes: a porous support and a first gas filtration film pair on the porous support. The first gas filtration film pair includes a first hydrogen permeation layer and a first c-LDH layer, and the first hydrogen permeation layer is disposed between the porous support and the first c-LDH layer. The method further includes providing a hydrogen-containing mixture gas on the first gas filtration film pair; and collecting hydrogen under the porous support.

In one embodiment, the hydrogen sequentially permeates through the first c-LDH layer, the first hydrogen permeation layer, and the porous support.

In one embodiment, the formation of the first c-LDH layer includes forming a layered double hydroxide on the first hydrogen permeation layer and heating the layered double hydroxide to 300° C. to 500° C., thereby forming the first c-LDH layer.

In one embodiment, the gas filtration structure further includes a second gas filtration film pair on the first gas filtration film pair, wherein the second gas filtration film pair includes a second hydrogen permeation layer and a second c-LDH layer, and the second hydrogen permeation layer is disposed between the first c-LDH layer and the second c-LDH layer.

In one embodiment, the hydrogen sequentially permeates through the second c-LDH layer, the second hydrogen permeation layer, the first c-LDH layer, the first hydrogen permeation layer, and the porous support.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1A:
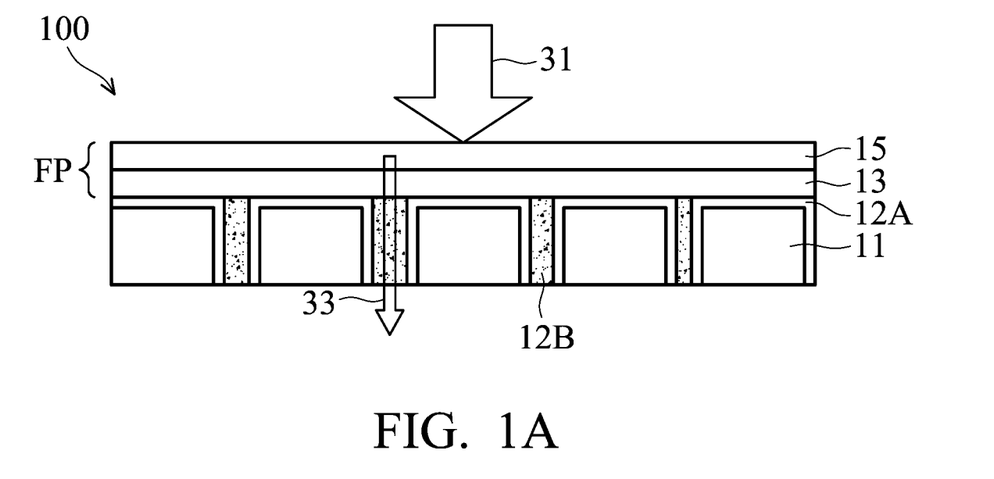
FIG. 1A shows a gas filtration structure in embodiments.

In one embodiment of the disclosure, a gas filtration structure 100 is provided as shown in FIG. 1A. The gas filtration structure 100 includes a porous support 11, and a gas filtration film pair FP on the porous support 11. The gas filtration film pair FP includes a hydrogen permeation layer 13 and a calcinated layered double hydroxide (c-LDH) layer 15, and the hydrogen permeation layer 13 is disposed between the porous support 11 and the c-LDH layer 15. In one embodiment, the porous support 11 includes stainless steel, ceramic, or glass, and pores of the porous support 11 have a size of 1 micrometer to 20 micrometers. If the pores in the porous support 11 are too small, this may result in an overly low total gas flux. If the pores of the porous support 11 are too large, an overly thick hydrogen permeation layer is needed to cover the pores, thereby reducing the practicability of the gas filtration structure, because too thick a hydrogen permeation layer costs a lot and has too low a hydrogen flux. In general, the ceramic and glass have a more regular pore size and pore distribution, but it is difficult to integrate a ceramic or glass support with other components due to the lower processability of the ceramic and glass. Stainless steel can easily be integrated with other components, but it has a less uniform pore size and pore distribution.

Alternatively, the surface of the stainless steel porous support can be modified to mitigate the problem of non-uniform pores, and reduce the desired thickness of the subsequently formed hydrogen permeation layer. For example, the surface of the porous support 11 can be wrapped by an LDH layer, which can then be calcinated to form a calcinated LDH (c-LDH) layer 12A. The LDH layer can be formed by co-precipitation, hydrothermal synthesis, ionic exchange, or a combination thereof. The LDH layer can be calcinated at 300° C. to 450° C. under ambient pressure and ambient atmosphere. If the LDH layer is calcinated at an overly low temperature, the water and hydroxyl ion in the interlayer of the LDH layer will not be removed, which may block the hydrogen permeation and lower the hydrogen permeation rate. If the LDH layer is calcinated at an overly high temperature, the stainless steel may soften and deform. In one embodiment, the c-LDH layer 12A has a thickness of 1 micrometer to 10 micrometers. An overly thin c-LDH layer 12A has no protective effect. An overly thick c-LDH layer 12A may increase the cost. In addition, pores of the porous support 11 can be filled by filling particles 12B with a particle size of 1 micrometer to 30 micrometers. The filling particles 12 can be made of aluminum oxide, silicon oxide, calcium oxide, cerium oxide, titanium oxide, chromium oxide, manganese oxide, iron oxide, nickel oxide, copper oxide, zinc oxide, zirconium oxide, or a combination thereof. Filling particles 12B that are too small cannot efficiently fulfill the pores of the porous support 11. Filling particles 12B that are too large cannot fit the pores of the porous support 11. Alternatively, the pores of the porous support 11 can be filled by the filling particles 12B. Subsequently, the porous support 11 is then wrapped by the LDH layer, and the LDH layer is then calcinated to form the c-LDH layer 12A as described above.

Thereafter, the hydrogen permeation layer 13 is formed on the porous support 11. In one embodiment, the hydrogen permeation layer 13 includes palladium, silver, copper, gold, nickel, platinum, aluminum, gallium, indium, thallium, germanium, tin, lead, antimony, bismuth, the like, or a combination thereof. The hydrogen permeation layer 13 can be formed by electroless plating, sputtering, physical vapor deposition, or another suitable process. In one embodiment, the hydrogen permeation layer 13 has a thickness of 1 micrometer to 100 micrometers. In one embodiment, the hydrogen permeation layer 13 has a thickness of 5 micrometers to 10 micrometers. If the hydrogen permeation layer 13 is too thin, its ability to purify hydrogen at high temperatures after long-term use may be compromised, due to defects that occur during use. Using a hydrogen permeation layer 13 that is too thick will not only reduce the hydrogen flux but also increase the cost. Thereafter, the surface of the hydrogen permeation layer 13 is wrapped by an LDH layer, and the LDH layer is then calcinated to form the c-LDH layer 15. The hydrogen permeation layer 13 and the c-LDH layer 15 are collectively referred as the gas filtration film pair FP. The LDH layer can be formed by co-precipitation, hydrothermal synthesis, ionic exchange, or a combination thereof. The LDH layer can be calcinated at 300° C. to 500° C. under ambient pressure and an ambient atmosphere. If the LDH layer is calcinated at too low a temperature, the water and hydroxyl ion in the interlayer of the LDH layer will not be removed, which may block hydrogen permeation and lower the hydrogen permeation rate. If the LDH layer is calcinated at too high a temperature, the stainless steel may soften and deform. In one embodiment, the c-LDH layer 15 has a thickness of 1 micrometer to 50 micrometers. In one embodiment, the c-LDH layer 15 has a thickness of 5 micrometers to 20 micrometers. A c-LDH layer 15 that is too thin has no protective effect. A c-LDH layer 15 that is too thick may increase the cost. In one embodiment, the c-LDH layer 15 has an interlayer spacing of 2.89 Å to 3.64 Å. Interlayer spacing that is too short may reduce the hydrogen flux of the mixture gas permeating through the gas filtration structure 100. Interlayer spacing that is too long may lower the hydrogen purity of the gas permeating through the gas filtration structure 100.

In one embodiment, the c-LDH layer 12A (wrapping the stainless steel porous support 11) and the c-LDH layer 15 (wrapping the hydrogen permeation layer 13) are the same. Alternatively, the layer 12A (wrapping the stainless steel porous support. 11) and the c-LDH layer 15 (wrapping the hydrogen permeation layer 13) are different. The LDH has a chemical structure of $[M^{II}_{1-x}M^{III}_x(OH)_2]A^{n-}_{x/n}\cdot mH_2O$, wherein $M^{II}$ is $Mg^{2+}$, $Zn^{2+}$, $Fe^{2+}$, $Ni^{2+}$, $Co^{2-}$, or $Cu^{2+}$; $M^{III}$ is $Al^{3+}$, $Cr^{3+}$, $Fe^{3+}$, or $Sc^{3+}$; $A^{n-}$ is $CO_3^{2-}$, $Cl^-$, $NO_3^-$, $SO_4^{2+}$, $PO_4^{3-}$, or $C_6H_4(COO^-)_2$; and x is 0.2 to 0.33. Part or all of $M^{II}$ can be replaced with $Li^+$. For example, the LDH layer can be an LDH of Li and Al. In one embodiment, the c-LDH layers 12A and 15 contain the $CO_3^{2-}$ functional group to achieve the desired interlayer spacing.

Figure 1B:
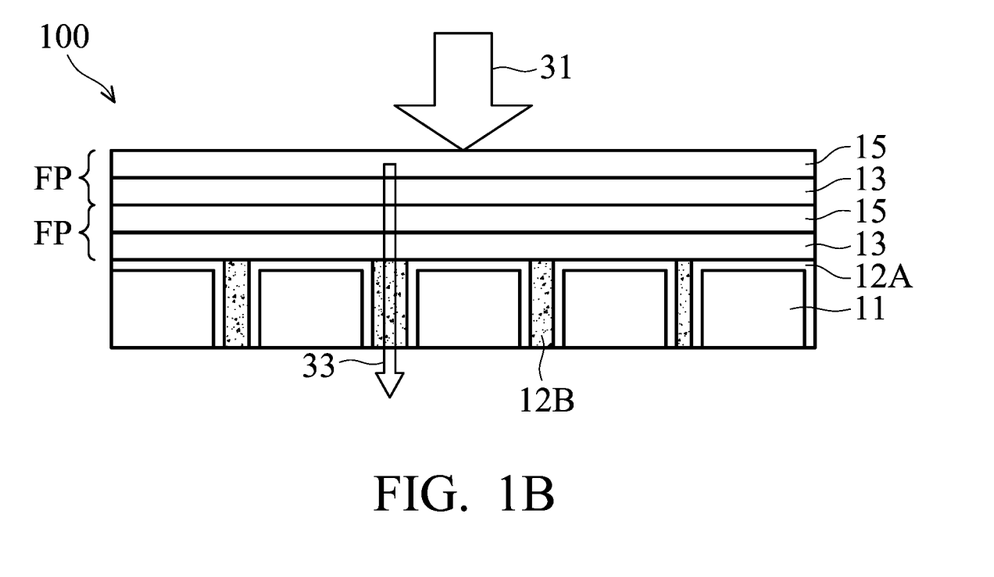
FIG. 1B shows a gas filtration structure in embodiments.
Figure 1C:
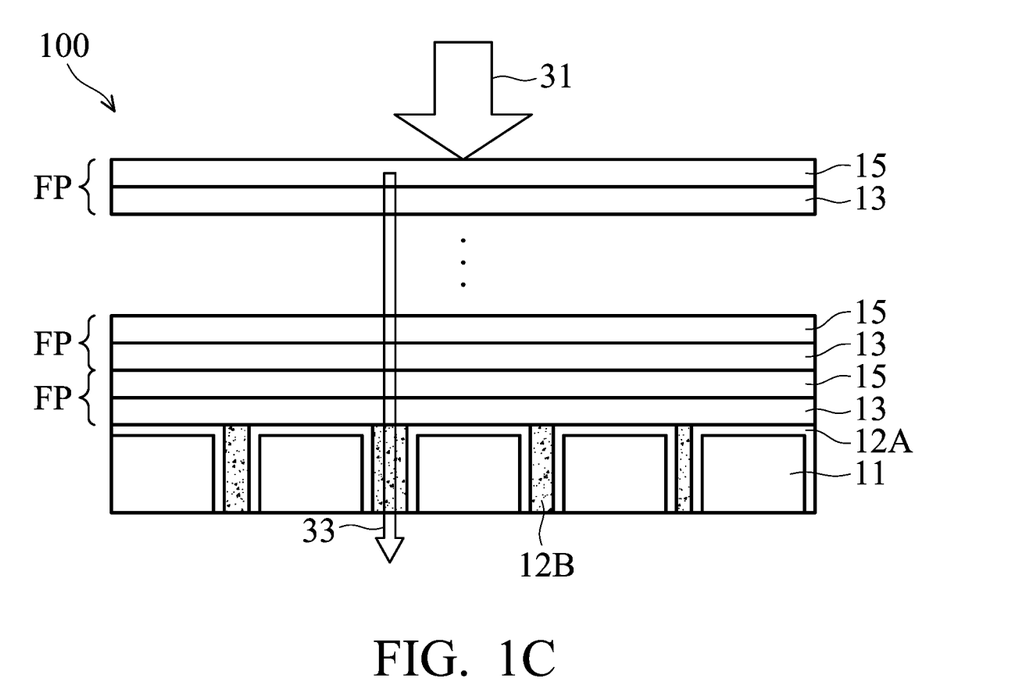
FIG. 1C shows a gas filtration structure in embodiments.

Alternatively, another gas filtration film pair FP can be formed on the described gas filtration film pair FP, as shown in FIG. 1B. In addition, more gas filtration film pairs FP can be formed, as shown in FIG. 1C. In FIGS. 1B and 1C, the gas filtration film pairs FP are substantially the same, and each of the gas filtration film pairs FP includes the hydrogen permeation layer 13 and the c-LDH layer 15. The formation of the gas filtration film pairs FP are substantially the same, in which the hydrogen permeation layer 13 is formed on the c-LDH layer 15 of the previously formed gas filtration film pair FP, and an LDH layer is formed on the hydrogen permeation layer 13. The LDH layer is then calcinated to form the c-LDH layer 15 on the hydrogen permeation layer 13, thereby completing the gas filtration film pairs FP. The above steps can be repeated several times to form a plurality of gas filtration film pairs FP. In some embodiments, the composition and/or thickness of the hydrogen permeation layers 13 in the different gas filtration film pairs FP may be similar. In another embodiment, the hydrogen permeation layers 13 in the different gas filtration film pairs FP may have different compositions and/or different thicknesses. The selections of the materials of the hydrogen permeation layer 13 and the c-LDH layer 15 in the gas filtration film pairs FP are similar to those described above, and the related description is omitted here. In some embodiments, the c-LDH layers 15 in the different gas filtration film pairs FP may have a similar composition and/or a similar thickness. In some embodiments, the c-LDH layers 15 in the different gas filtration film pairs FP may have different compositions and/or different thicknesses. Compared to the gas filtration structure with the only one gas filtration film pair FP, the gas filtration structure with the plurality of gas filtration film pairs FP has a higher selectivity of hydrogen and other gas. On the other hand, the total thickness of the hydrogen permeation layers 13 in the plurality of gas filtration film pairs FP is smaller than the thickness of the hydrogen permeation layer in the only one gas filtration film pair FP, thereby further lowering the cost of the gas filtration structure. For example, the hydrogen permeation layers 13 in the plurality of gas filtration film pairs FP (see FIG. 1B or 1C) have a total thickness of 1 micrometer to 16 micrometers, such as 4 micrometers to 8 micrometers.

In one embodiment, the gas filtration structure 100 can be used to filter gas. For example, hydrogen-containing mixture gas 31 (e.g. methanol-reformed gas) can be provided on the c-LDH layer 15, and hydrogen 33 can be collected under the porous support 11. The hydrogen 33 in the mixture gas 31 may sequentially permeate through the c-LDH layer 15, the hydrogen permeation layer 13, and the porous support 11. In one embodiment, the gas collected under the porous support 11 may have a hydrogen concentration (purity) over 99%. The c-LDH layer 15 formed on the hydrogen permeation layer 13 would not lower the hydrogen flux of the gas filtration structure 100, and largely increase the selectivity of hydrogen and other gas of the gas filtration structure 100. In addition, the gas filtration structure 100 may keep its original effect of purification after long-term use (long-term stability). As described above, the gas filtration structure 100 with a plurality of gas filtration film pairs FP (see FIGS. 1B and 1C) has a higher selectivity of hydrogen and other gases than that of the gas filtration structure 100 with the only one gas filtration film pair FP (see FIG. 1A).

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1

AlLi intermetallic compound was ground to powder with a particle size of 100 micrometers to 1000 micrometers. The AlLi intermetallic compound has a Li content of about 18 wt % to 21 wt %. The AlLi intermetallic compound powder was put into 100 mL of pure water, which was bubbled by nitrogen and stirred under ambient atmosphere for several minutes, so that most of the AlLi intermetallic compound powder reacted with the water and dissolved in the water. The above solution was filtered by a filter paper (No. 5A) to remove impurities, thereby obtaining a clean alkaline solution containing $Li^+$ and $Al^{3+}$. The alkaline solution had a pH value of about 11.0 to 12.3. The alkaline solution was analyzed by inductively coupled plasma-atomic emission spectrometry (ICP-AES) to determine its $Li^+$ concentration (about 146±37 ppm) and $Al^{3+}$ concentration (about 185±13 ppm).

A porous stainless steel (PSS, Pall Accusep Filter, Filter P/N: 7CC6L465236235SC02) was received, and each of the pores of the PSS surface was filled with aluminum oxide particles with an average particle size of 10 micrometers. The PSS filled with the aluminum oxide particles was immersed in the alkaline solution (containing $Li^+$ and $Al^{3+}$) for 2 hours and then dried, such that a lithium-containing aluminum hydroxide layer with a continuous phase, a layered double hydroxide (LDH) structure, and a sufficient thickness was formed on the PSS surface (LDH/PSS). The LDH layer had a thickness of about 3 micrometers. Thereafter, the LDH/PSS was calcinated at 450° C. for 2 hours to form c-LDH/PSS. The PSS having pores filled with the aluminum oxide and wrapped by the c-LDH layer (c-LDH/PSS) may be referred to as a porous support.

Subsequently, a palladium layer was formed on the c-LDH layer in the following steps. The c-LDH/PSS was sequentially immersed in a $SnCl_2$ solution, de-ionized water, a $PdCl_2$ solution, 0.01M HCl, and de-ionized water, and the above steps were repeated until the color of the sample surface changed to brown, signifying that the c-LDH/PSS was activated. The activated c-LDH/PSS was put into a palladium solution to perform electroless plating, thereby forming a palladium layer on the c-LDH to complete a Pd/c-LDH/PSS gas filtration structure. The palladium layer had a thickness of about 11.5 micrometers.

Comparative Example 1

In a chamber, hydrogen was provided on the palladium layer (Pd) of the Pd/c-LDH/PSS gas filtration structure in Preparation Example 1, and the pressure of the hydrogen was increased to 4 atm. As such, the hydrogen flux (at 4 atm) of the hydrogen permeating through the Pd/c-LDH/PSS gas filtration structure was measured under the PSS of the Pd/c-LDH/PSS gas filtration structure by a flow meter. The hydrogen fluxes at different pressures were regression calculated to obtain the hydrogen permeation rate of the hydrogen permeating through the Pd/c-LDH/PSS gas filtration structure. Next, the chamber pressure was reduced to ambient pressure, and nitrogen was provided on the Pd layer of the Pd/c-LDH/PSS gas filtration structure to drive out hydrogen. After the chamber was full of nitrogen, the pressure of the nitrogen on the Pd layer of the Pd/c-LDH/PSS gas filtration structure was increased to 4 atm. As such, the nitrogen flux (at 4 atm) of the nitrogen permeating through the Pd/c-LDH/PSS gas filtration structure was measured under the PSS of the Pd/c-LDH/PSS gas filtration structure by a flow meter. The hydrogen permeation rates of the Pd/c-LDH/PSS gas filtration structure at different temperatures were shown in FIG. 4. The $H_2/N_2$ selectivities (hydrogen flux/nitrogen flux) of the Pd/c-LDH/PSS gas filtration structure at different temperatures were shown in FIG. 5. The gas filtration structure had a hydrogen permeation rate of 74 $Nm^3/m^2 \cdot hr \cdot atm \cdot atm^{0.5}$ to 85 $Nm^3/m^2 \cdot hr \cdot atm^{0.5}$, and a $H_2/N_2$ selectivity of 3549 to 4205.

Preparation Example 2

AlLi intermetallic compound was ground to powder with a particle size of 100 micrometers to 1000 micrometers. The AlLi intermetallic compound has a Li content of about 18 wt % to 21 wt %. The AlLi intermetallic compound powder was put into 100 mL of pure water, which was bubbled by nitrogen and stirred under ambient atmosphere for several minutes, so that most of the AlLi intermetallic compound powder reacted with the water and dissolved in the water. The above solution was filtered by a filter paper (No. 5A) to remove impurities, thereby obtaining a clean alkaline solution containing $Li^+$ and $Al^{3+}$. The alkaline solution had a pH value of about 11.0 to 12.3. The alkaline solution was analyzed by ICP-AES to determine its $Li^+$ concentration (about 146±37 ppm) and $Al^{3+}$ concentration (about 185±13 ppm).

A porous stainless steel (PSS, Pall Accusep Filter, Filter P/N: 7CC6L465236235SC02) was received, and each of the pores of the PSS surface was filled with aluminum oxide particles with an average particle size of 10 micrometers. The PSS filled with the aluminum oxide particles was immersed in the alkaline solution (containing $Li^+$ and $Al^{3+}$) for 2 hours and then dried, such that a lithium-containing aluminum hydroxide layer with a continuous phase, a layered double hydroxide (LDH) structure, and a sufficient thickness was formed on the PSS surface (LDH/PSS). The LDH layer had a thickness of about 3 micrometers. Thereafter, the LDH/PSS was calcinated at 450° C. for 2 hours to form c-LDH/PSS. The PSS having pores filled with the aluminum oxide and wrapped by the c-LDH layer (c-LDH/PSS) may be referred to as a porous support.

Subsequently, a palladium layer was formed on the c-LDH layer in the following steps. The c-LDH/PSS was sequentially immersed in a $SnCl_2$ solution, de-ionized water, a $PdCl_2$ solution, 0.01M HCl, and de-ionized water, and the above steps were repeated until the color of the sample surface changed to brown, signifying that the c-LDH/PSS was activated. The activated c-LDH/PSS was put into a palladium solution to perform electroless plating, thereby forming a palladium layer on the c-LDH to complete a Pd/c-LDH/PSS structure. The palladium layer had a thickness of about 11.5 micrometers.

1800 mL of de-ionized water was bubbled by nitrogen and stirred to avoid dissolving carbon dioxide in the water. AlLi intermetallic compound was pound, cracked, and then filtered by a sieve mesh (#325, pore size of 45 micrometers). 1.8 g of the filtered AlLi was added to the bubbled de-ionized water, which was then continuously bubbled and stirred for 20 minutes. The un-dissolved powder was filtered out by filter paper to obtain a front solution of LDH. The front solution was analyzed by ICP-AES to determine its $Li^+$ concentration (about 146±37 ppm) and $Al^{3+}$ concentration (about 185±13 ppm).

Figure 2A:
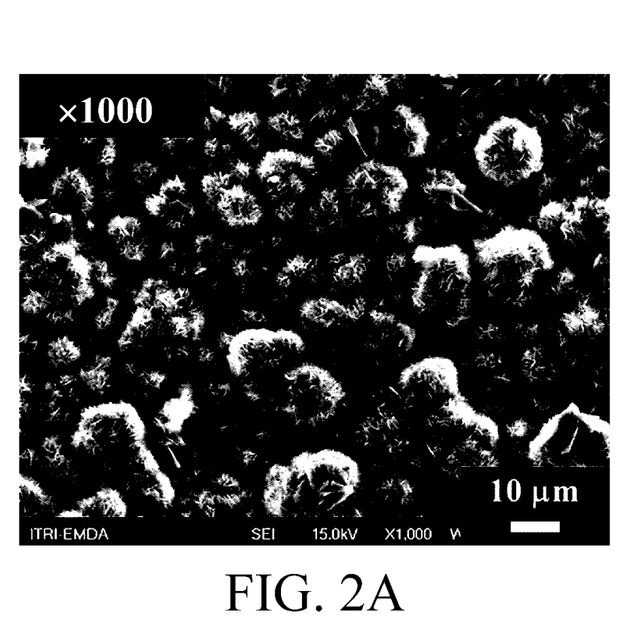
FIGS. 2A to 2D show microscopic photographs of the surface of the gas filtration structures in the embodiments.
Figure 2B:
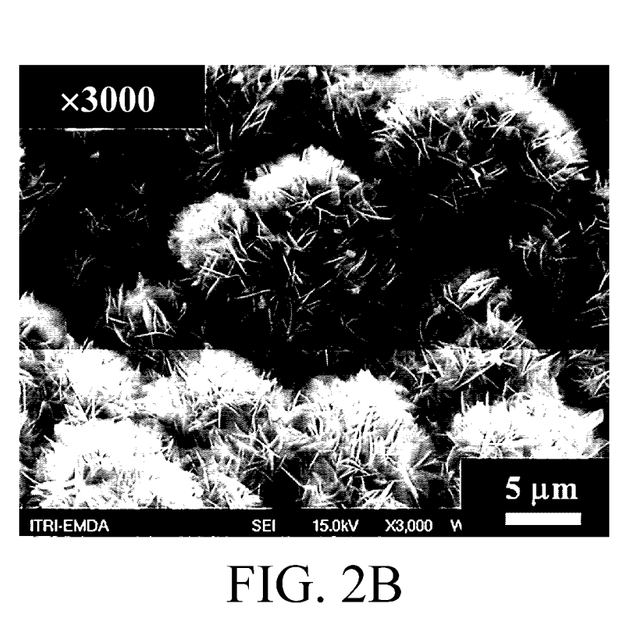
Figure 3A:
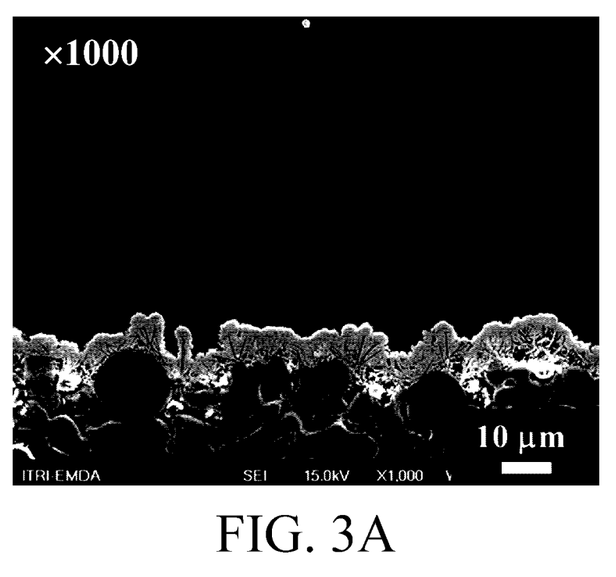
FIGS. 3A to 3D show microscopic photographs of the cross-section of the gas filtration structures in the embodiments.
Figure 3B:
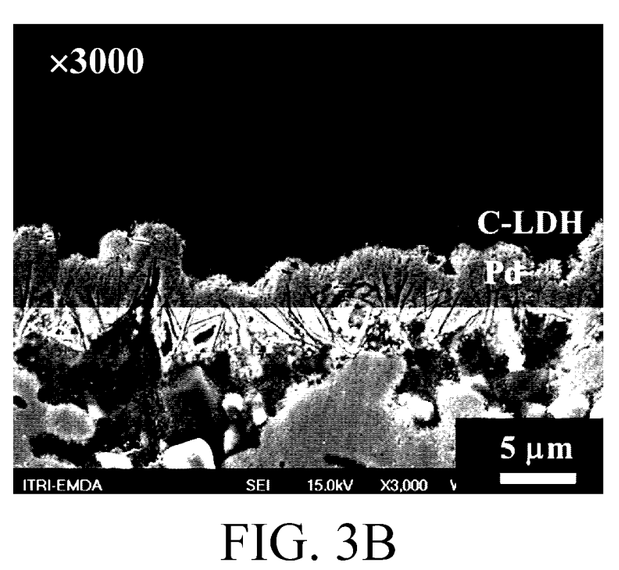

Thereafter, the Pd/c-LDH/PSS structure was immersed in the front solution of LDH at 30° C. for 2 hours, then washed with de-ionized water, and then baked and calcinated at 400° C. to complete a gas filtration structure c-LDH/Pd/c-LDH/PSS (HP405). The microscopic photographs of the surface of the gas filtration structure are shown in FIG. 2A (×1000) and FIG. 2B (×3000), and the microscopic photographs of the cross-section of the gas filtration structure are shown in FIG. 3A (×1000) and FIG. 3B (×3000). The microscopic photographs were obtained by the microscope JEOL JSM-6500F. The gas filtration structure HP405 had the only one gas filtration film pair (c-LDH/Pd).

Preparation Example 3

AlLi intermetallic compound was ground to powder with a particle size of 100 micrometers to 1000 micrometers. The AlLi intermetallic compound has a Li content of about 18 wt % to 21 wt %. The AlLi intermetallic compound powder was put into 100 mL of pure water, which was bubbled by nitrogen and stirred under ambient atmosphere for several minutes, so that most of the AlLi intermetallic compound powder reacted with the water and dissolved in the water. The above solution was filtered by a filter paper (No. 5A) to remove impurities, thereby obtaining a clean alkaline solution containing $Li^+$ and $Al^{3+}$. The alkaline solution had a pH value of about 11.0 to 12.3. The alkaline solution was analyzed by ICP-AES to determine its $Li^+$ concentration (about 146±37 ppm) and $Al^{3+}$ concentration (about 185±13 ppm).

A porous stainless steel (PSS, Pall Accusep Filter, Filter P/N: 7CC6L465236235SC02) was received, and each of the pores of the PSS surface was filled with aluminum oxide particles with an average particle size of 10 micrometers. The PSS filled with the aluminum oxide particles was immersed in the alkaline solution (containing $Li^+$ and $Al^{3+}$) for 2 hours and then dried, such that a lithium-containing aluminum hydroxide layer with a continuous phase, a layered double hydroxide (LDH) structure, and a sufficient thickness was formed on the PSS surface (LDH/PSS). The LDH layer had a thickness of about 3 micrometers. Thereafter, the LDH/PSS was calcinated at 450° C. for 2 hours to form c-LDH/PSS. The PSS having pores filled with the aluminum oxide and wrapped by the c-LDH layer (c-LDH/PSS) may be referred to as a porous support.

Subsequently, a palladium layer was formed on the c-LDH layer in the following steps. The c-LDH/PSS was sequentially immersed in a SnCl$_2$ solution, de-ionized water, a PdCl$_2$ solution, 0.01M HCl, and de-ionized water, and the above steps were repeated until the color of the sample surface changed to brown, signifying that the c-LDH/PSS was activated. The activated c-LDH/PSS was put into a palladium solution to perform electroless plating, thereby forming a palladium layer on the c-LDH to complete a Pd/c-LDH/PSS structure. The palladium layer had a thickness of about 11.5 micrometers.

1800 mL of de-ionized water was bubbled by nitrogen and stirred to avoid dissolving carbon dioxide in the water. AlLi intermetallic compound was pound, cracked, and then filtered by a sieve mesh (#325, pore size of 45 micrometers). 1.8 g of the filtered AlLi was added to the bubbled de-ionized water, which was then continuously bubbled and stirred for 20 minutes. The un-dissolved powder was filtered out by filter paper to obtain a front solution of LDH. The front solution was analyzed by ICP-AES to determine its Li$^+$ concentration (about 146±37 ppm) and Al$^{3+}$ concentration (about 185±13 ppm).

Thereafter, the Pd/c-LDH/PSS structure was immersed in the front solution of LDH at 30° C. for 2 hours, then washed with de-ionized water, and then baked and calcinated at 400° C. to complete a gas filtration structure c-LDH/Pd/c-LDH/PSS (HP537). The gas filtration structure HP537 had the only one gas filtration film pair (c-LDH/Pd). Preparation Example 2 and Preparation Example 3 were different in their porous stainless steel, in which the pore distributions and pore sizes of the two examples of porous stainless steel were slightly different (even with the same Serial No. from the same supplier).

Preparation Example 4

AlLi intermetallic compound was ground to powder with a particle size of 100 micrometers to 1000 micrometers. The AlLi intermetallic compound has a Li content of about 18 wt % to 21 wt %. The AlLi intermetallic compound powder was put into 100 mL of pure water, which was bubbled by nitrogen and stirred under ambient atmosphere for several minutes, so that most of the AlLi intermetallic compound powder reacted with the water and dissolved in the water. The above solution was filtered by a filter paper (No. 5A) to remove impurities, thereby obtaining a clean alkaline solution containing Li$^+$ and Al$^{3+}$. The alkaline solution had a pH value of about 11.0 to 12.3. The alkaline solution was analyzed by ICP-AES to determine its Li$^+$ concentration (about 146±37 ppm) and Al$^{3+}$ concentration (about 185±13 ppm).

A porous stainless steel (PSS, Pall Accusep Filter, Filter P/N: 7CC6L465236235SC02) was received, and each of the pores of the PSS surface was filled with aluminum oxide particles with an average particle size of 10 micrometers. The PSS filled with the aluminum oxide particles was immersed in the alkaline solution (containing Li$^+$ and Al$^{3+}$) for 2 hours and then dried, such that a lithium-containing aluminum hydroxide layer with a continuous phase, a layered double hydroxide (LDH) structure, and a sufficient thickness was formed on the PSS surface (LDH/PSS). The LDH layer had a thickness of about 3 micrometers. Thereafter, the LDH/PSS was calcinated at 450° C. for 2 hours to form c-LDH/PSS. The PSS having pores filled with the aluminum oxide and wrapped by the c-LDH layer (c-LDH/PSS) may be referred to as a porous support.

Subsequently, a palladium layer was formed on the c-LDH layer in the following steps. The c-LDH/PSS was sequentially immersed in a SnCl$_2$ solution, de-ionized water, a PdCl$_2$ solution, 0.01M HCl, and de-ionized water, and the above steps were repeated until the color of the sample surface changed to brown, signifying that the c-LDH/PSS was activated. The activated c-LDH/PSS was put into a palladium solution to perform electroless plating, thereby forming a palladium layer on the c-LDH to complete a Pd/c-LDH/PSS structure. The palladium layer had a thickness of about 11.5 micrometers.

1800 mL of de-ionized water was bubbled by nitrogen and stirred to avoid dissolving carbon dioxide in the water. AlLi intermetallic compound was pound, cracked, and then filtered by a sieve mesh (#325, pore size of 45 micrometers). 1.8 g of the filtered AlLi was added to the bubbled de-ionized water, which was then continuously bubbled and stirred for 20 minutes. The un-dissolved powder was filtered out by filter paper to obtain a front solution of LDH. The front solution was analyzed by ICP-AES to determine its Li$^+$ concentration (about 146±37 ppm) and Al$^{3+}$ concentration (about 185±13 ppm).

Figure 2C:
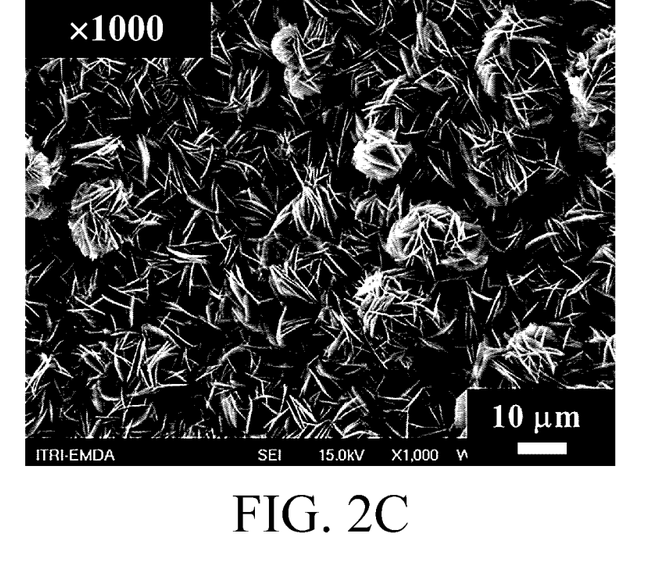
Figure 2D:
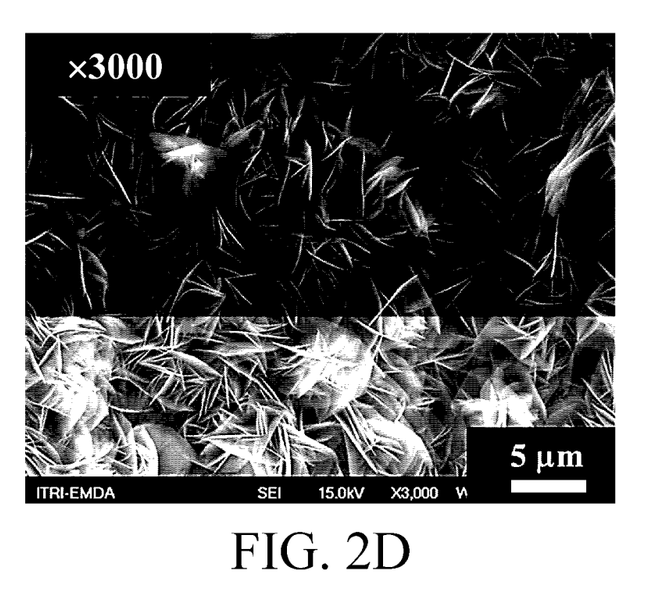
Figure 3C:
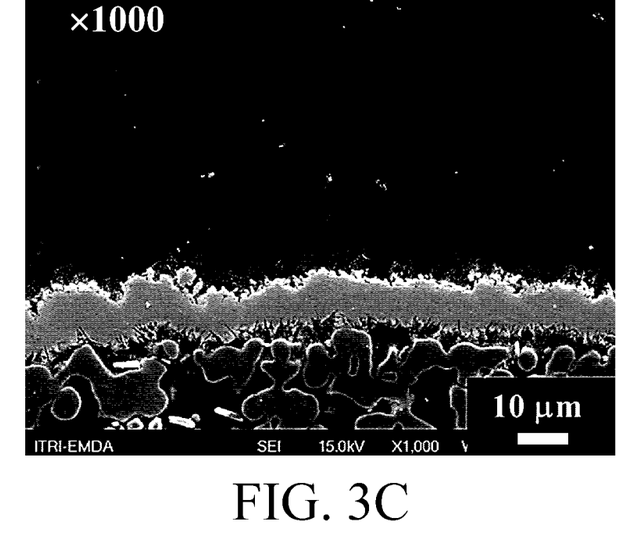
Figure 3D:
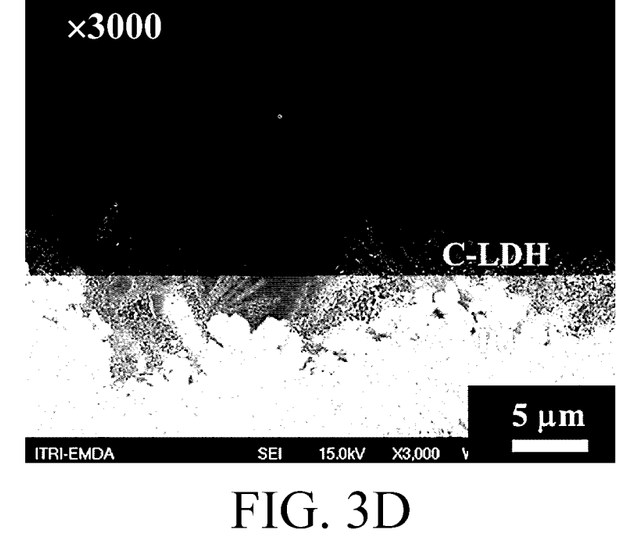

Thereafter, the Pd/c-LDH/PSS structure was immersed in the front solution of LDH at 30° C. for 2 hours, then washed with de-ionized water, and then baked. The above steps (e.g. immersion, wash, and bake) were repeated 3 times, and the sample was then calcinated at 400° C. to complete a gas filtration structure c-LDH/Pd/c-LDH/PSS. The microscopic photographs of the surface of the gas filtration structure are shown in FIG. 2C (×1000) and FIG. 2D (×3000), and the microscopic photographs of the cross-section of the gas filtration structure are shown in FIG. 3C (×1000) and FIG. 3D (×3000). The microscopic photographs were obtained by the microscope JEOL JSM-6500F. The gas filtration structure had the only one gas filtration film pair (c-LDH/Pd).

Example 1

The hydrogen flux and H$_2$/N$_2$ selectivity of the gas filtration structure HP405 (Preparation Example 2) were measured as described below. In a chamber, hydrogen of 4 atm and 400° C. was provided on the c-LDH layer of the gas filtration structure HP405 for 24 hours, and the hydrogen flux (at 4 atm) of the hydrogen permeating through the gas filtration structure HP405 was measured under the PSS of the gas filtration structure HP405 by a flow meter. Next, the chamber pressure was reduced to ambient pressure, and nitrogen was provided on the c-LDH layer of the gas filtration structure HP405 to drive out hydrogen. After the chamber was full of nitrogen, the pressure of the nitrogen on the c-LDH layer of the gas filtration structure HP405 was increased to 4 atm. As such, the nitrogen flux (at 4 atm) of the nitrogen permeating through the gas filtration structure HP405 was measured under the PSS of the gas filtration structure HP405 by a flow meter. The above steps (e.g. providing hydrogen for 24 hours and providing nitrogen) were repeated to measure the hydrogen flux and the nitrogen flux. As such, the hydrogen flux and the H$_2$/N$_2$ selectivity (defined as hydrogen flux/nitrogen flux) of the gas filtration structure HP405 after long-term operation were obtained. As shown in Table 1, the gas filtration structure HP405 still had a similar purification effect after long-term operation at 400° C. It shows that the gas filtration structure HP405 has long-term stability.

TABLE 1

| Days | Hydrogen flux (Nm$^3$/m$^2$ · hr) | Selectivity (H$_2$/N$_2$) |
|---|---|---|
| 1 | 100 | 11818 |
| 2 | 100 | 10669 |

TABLE 1-continued

| Days | Hydrogen flux (Nm$^3$/m$^2$ · hr) | Selectivity (H$_2$/N$_2$) |
|---|---|---|
| 3 | 99 | 10710 |
| 4 | 100 | 10661 |
| 5 | 100 | 10797 |
| 6 | 99 | 10118 |

Example 2

Figure 4:
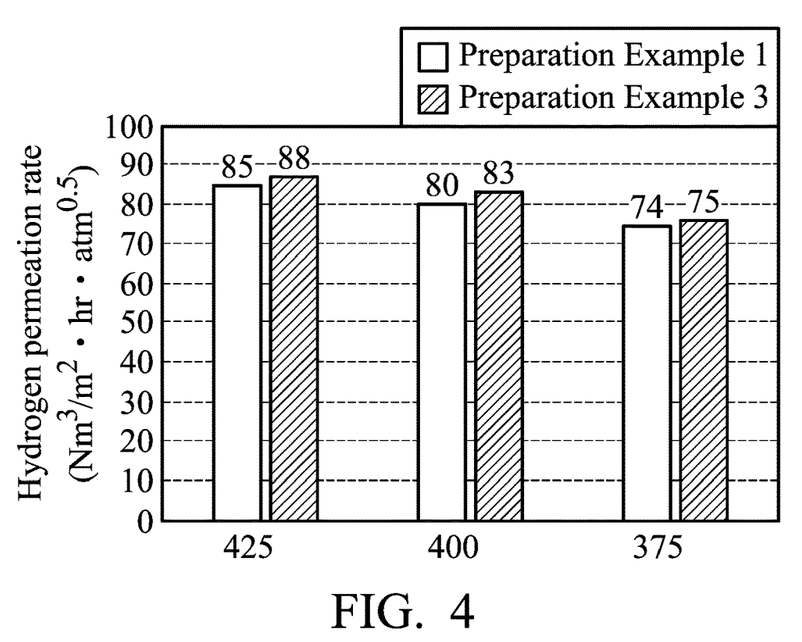
FIG. 4 shows hydrogen permeation rates of hydrogen at different temperatures permeating through the gas filtration structure in one embodiment.
Figure 5:
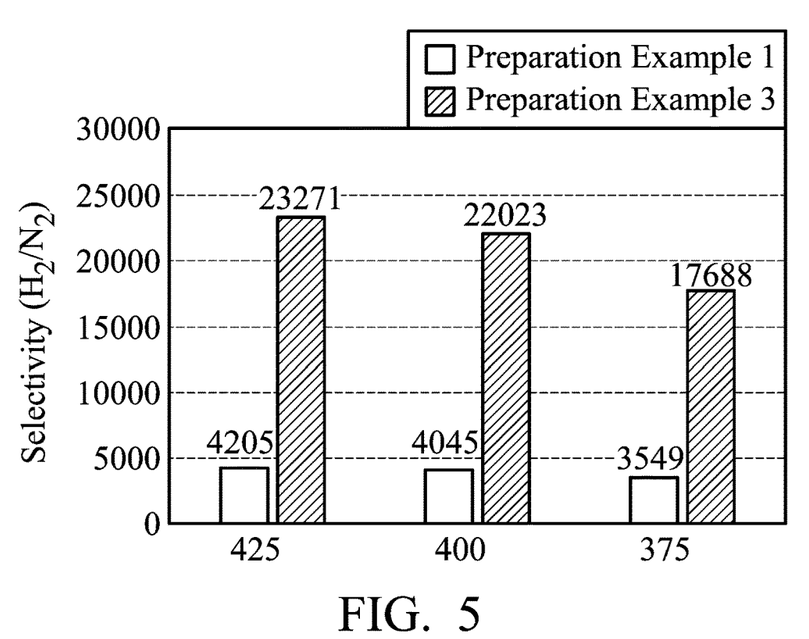
FIG. 5 shows selectivities of hydrogen and nitrogen at different temperatures permeating through the gas filtration structure in one embodiment.

The hydrogen flux of hydrogen at different temperatures permeating the gas filtration structure HP537 (Preparation Example 3), and the nitrogen flux of the nitrogen at different temperature permeating the gas filtration structure HP537 were measured as described below. In a chamber, hydrogen was provided on the c-LDH layer of the gas filtration structure HP537, and the pressure of the hydrogen was increased to 4 atm. As such, the hydrogen flux (at 4 atm) of the hydrogen permeating through the gas filtration structure HP537 was measured under the PSS of the gas filtration structure HP537 by a flow meter. The hydrogen fluxes at different pressures were regression calculated to obtain the hydrogen permeation rate of the hydrogen permeating through the Pd/c-LDH/PSS gas filtration structure. Next, the chamber pressure was reduced to ambient pressure, and nitrogen was provided on the c-LDH layer of the gas filtration structure HP537 to drive out hydrogen. After the chamber was full of nitrogen, the pressure of the nitrogen on the c-LDH layer of the gas filtration structure HP537 was increased to 4 atm. As such, the nitrogen flux (at 4 atm) of the nitrogen permeating through the gas filtration structure HP537 was measured under the PSS of the gas filtration structure HP537 by a flow meter. The hydrogen temperature and the nitrogen temperature were changed to measure the hydrogen permeation rate at different temperatures (FIG. 4) and the H$_2$/N$_2$ selectivity at different temperatures (FIG. 5, hydrogen flux/nitrogen flux) of the gas filtration structure HP537. As shown in FIG. 4, the c-LDH wrapping on the Pd layer could slightly enhance the hydrogen permeation rate of the gas filtration structure. As shown in FIG. 5, the c-LDH wrapping on the Pd layer could largely increase the H$_2$/N$_2$ selectivity, signifying that the hydrogen ratio of the mixture gas permeating through the c-LDH/Pd/c-LDH/PSS gas filtration structure could be largely increased. The gas filtration structure HP537 had a hydrogen permeation rate of 75 Nm$^3$/m$^2$·hr·atm$^{0.5}$ to 88 Nm$^3$/m$^2$·hr·atm$^{0.5}$, and a H$_2$/N$_2$ selectivity of 17688 to 23271.

Example 3

Figure 6:
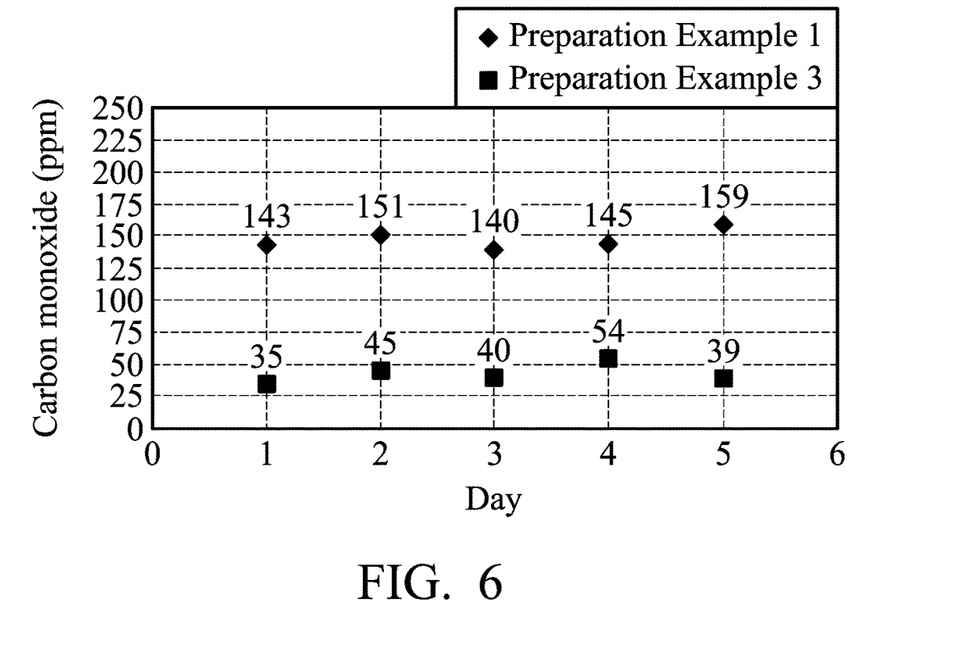
FIG. 6 shows the carbon monoxide concentration of methanol-reformed gas after permeating through the gas filtration structure in one embodiment.
Figure 7:
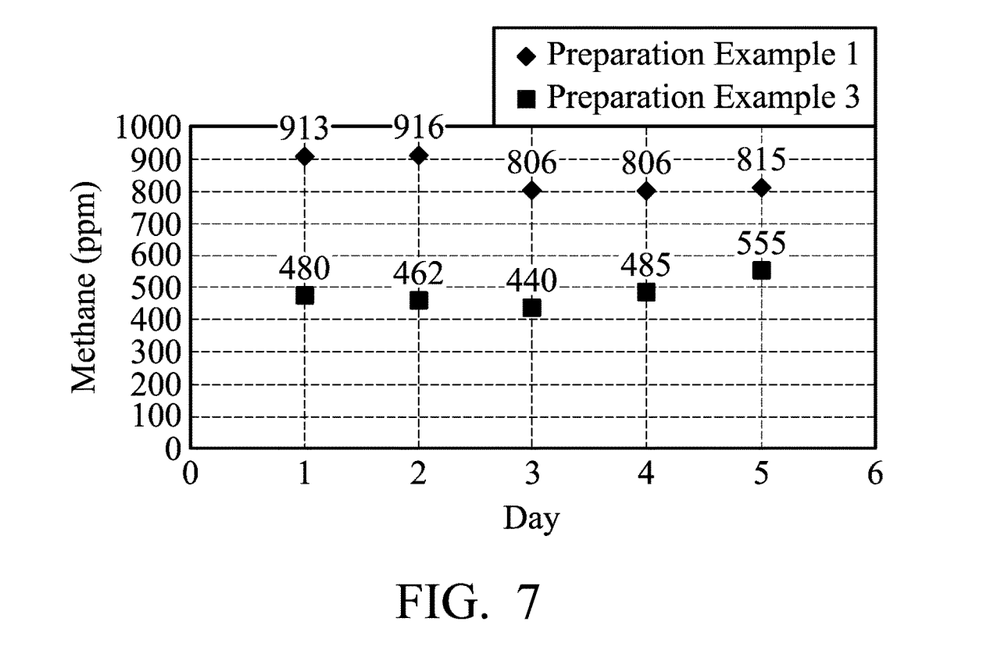
FIG. 7 shows the methane concentration of methanol-reformed gas after permeating through the gas filtration structure in one embodiment.

The gas filtration structure in Preparation Example 1 and the gas filtration structure HP537 in Preparation Example 3 were selected to measure the gas composition of methanol-reformed gas after permeating through the gas filtration structures. In a chamber, methanol-reformed gas (composed of 0.15% of CH$_4$, 0.80% of CO, 24.58% of CO$_2$, and 74.47% of H$_2$) of 400° C. and 4 atm was provided on the Pd of the Pd/c-LDH/PSS gas filtration structure in Preparation Example 1. The carbon monoxide concentration (FIG. 6) and the methane concentration (FIG. 7) of the methanol-reformed gas after permeating through the Pd/c-LDH/PSS gas filtration structure were measured under the PSS of the Pd/c-LDH/PSS gas filtration structure. In a chamber, methanol-reformed gas (composed of 0.15% of CH$_4$, 0.80% of CO, 24.58% of CO$_2$, and 74.47% of H$_2$) of 400° C. and 4 atm was provided on the c-LDH layer of the gas filtration structure HP537 in Preparation Example 3. The carbon monoxide ratio (FIG. 6) and the methane ratio (FIG. 7) of the methanol-reformed gas after permeating through the gas filtration structure HP537 were measured under the PSS of the gas filtration structure HP537. As shown in FIG. 6, the gas filtration structure HP537 with the Pd layer wrapped by the c-LDH could efficiently block the carbon monoxide, e.g. the carbon monoxide concentration was reduced from 140 ppm to 159 ppm (Preparation Example 1) to 35 ppm to 54 ppm (Preparation Example 3). As shown in FIG. 7, the gas filtration structure HP537 with the Pd layer wrapped by the c-LDH could also efficiently block the methane, e.g. the methane concentration was reduced from 806 ppm to 913 ppm (Preparation Example 1) to 440 ppm to 555 ppm (Preparation Example 3).

Example 4

Figure 8:
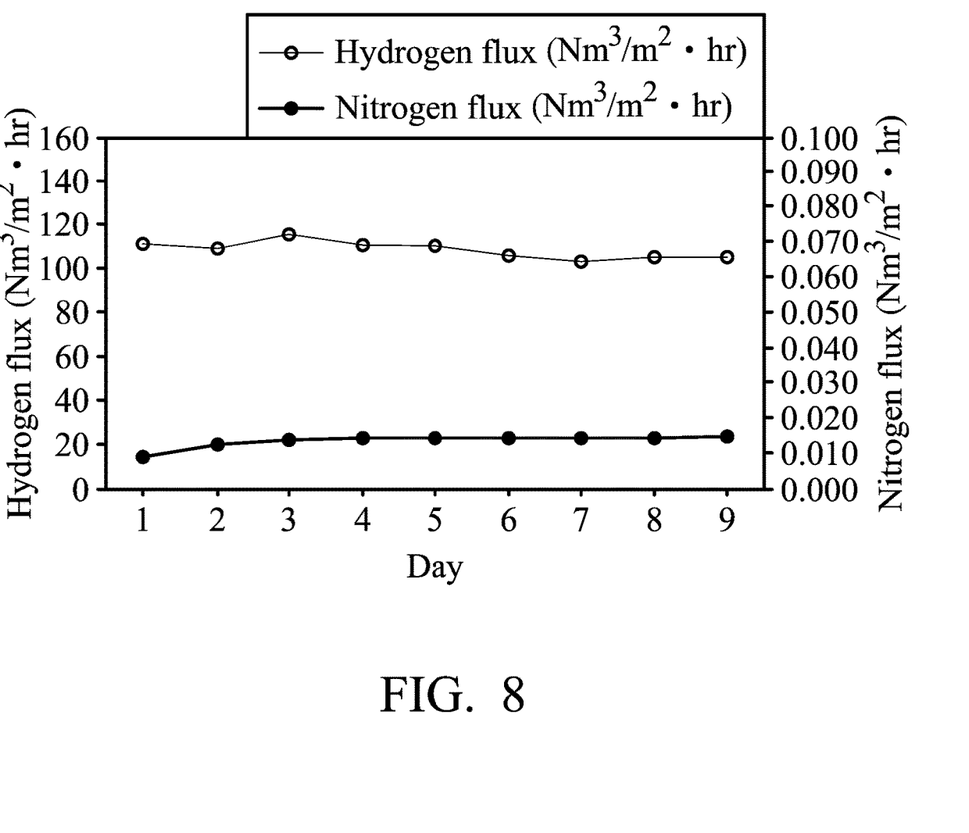
FIG. 8 shows a comparison of hydrogen flux of hydrogen permeating through the gas filtration structure and nitrogen flux of nitrogen permeating through the gas filtration structure, in which the methanol-reformed gas permeates through the gas filtration structure for a long time before measuring the hydrogen flux and the nitrogen flux.

The gas filtration structure HP537 in Preparation Example 3 was selected to measure its stability. In a chamber, methanol-reformed gas of 380° C. and 4 atm was provided to permeate through the gas filtration structure HP537 for 24 hours. Hydrogen at 380° C. was provided on the c-LDH layer of the gas filtration structure HP537, and the pressure of the hydrogen was increased to 4 atm. As such, the hydrogen flux (at 4 atm) of the hydrogen permeating through the gas filtration structure HP537 was measured under the PSS of the gas filtration structure HP537 by a flow meter. Next, the chamber pressure was reduced to ambient pressure, and nitrogen was provided on the c-LDH layer of the gas filtration structure HP537 to drive out hydrogen. After the chamber was full of nitrogen, the pressure of the nitrogen on the c-LDH layer of the gas filtration structure HP537 was increased to 4 atm. As such, the nitrogen flux (at 4 atm) of the nitrogen permeating through the gas filtration structure HP537 was measured under the PSS of the gas filtration structure HP537 by a flow meter. The steps of providing the methanol-reformed gas for 24 hours, providing hydrogen, and providing nitrogen were repeated several times to measure the hydrogen flux and the nitrogen flux, respectively. The above cycle was repeated for 9 days, and the hydrogen flux and the nitrogen flux of the gas filtration structure HP537 at everyday were shown in Table 8. In FIG. 8, the hydrogen flux and the nitrogen flux of the gas filtration structure in different days were stable. Note that the carbon monoxide and methane in the methanol-reformed gas have been considered toxic to palladium in this field. However, the carbon monoxide and methane in the methanol-reformed gas would not damage the gas filtration structure or shorten the gas filtration structure lifespan.

Preparation Example 5

AlLi intermetallic compound was ground to powder with a particle size of 100 micrometers to 1000 micrometers. The AlLi intermetallic compound has a Li content of about 18 wt % to 21 wt %. The AlLi intermetallic compound powder was put into 100 mL of pure water, which was bubbled by nitrogen and stirred under ambient atmosphere for several minutes, so that most of the AlLi intermetallic compound powder reacted with the water and dissolved in the water. The above solution was filtered by a filter paper (No. 5A) to remove impurities, thereby obtaining a clean alkaline solution containing Li$^+$ and Al$^{3+}$. The alkaline solution had a pH value of about 11.0 to 12.3. The alkaline solution was analyzed by ICP-AES to determine its $Li^+$ concentration (about 146±37 ppm) and $Al^{3+}$ concentration (about 185±13 ppm).

A porous stainless steel (PSS, Pall Accusep Filter, Filter P/N: 7CC6L465236235SC02) was received, and each of the pores of the PSS surface was filled with aluminum oxide particles with an average particle size of 10 micrometers. The PSS filled with the aluminum oxide particles was immersed in the alkaline solution (containing $Li^+$ and $Al^{3+}$) for 1 hour and then dried, such that a lithium-containing aluminum hydroxide layer with a continuous phase, a layered double hydroxide (LDH) structure, and a sufficient thickness was formed on the PSS surface (LDH/PSS). The LDH layer had a thickness of about 3 micrometers. Thereafter, the LDH/PSS was calcinated at 450° C. for 2 hours to form c-LDH/PSS. The PSS having pores filled with the aluminum oxide and wrapped by the c-LDH layer (c-LDH/PSS) may be referred to as a porous support.

Subsequently, a palladium layer was formed on the c-LDH layer in the following steps. The c-LDH/PSS was sequentially immersed in a $SnCl_2$ solution, de-ionized water, a $PdCl_2$ solution, 0.01M HCl, and de-ionized water, and the above steps were repeated until the color of the sample surface changed to brown, signifying that the c-LDH/PSS was activated. The activated c-LDH/PSS was put into a palladium solution to perform electroless plating, thereby forming a palladium layer on the c-LDH to complete a Pd/c-LDH/PSS structure. The palladium layer had a thickness of about 8.19 micrometers. It should be understood that the thickness of the palladium layer could be controlled by the electroless plating period. A shorter electroless plating period formed a thinner palladium layer, and vice versa.

1800 mL of de-ionized water was bubbled by nitrogen and stirred to avoid dissolving carbon dioxide in the water. AlLi intermetallic compound was pound, cracked, and then filtered by a sieve mesh (#325, pore size of 45 micrometers). 1.8 g of the filtered AlLi was added to the bubbled de-ionized water, which was then continuously bubbled and stirred for 20 minutes. The un-dissolved powder was filtered out by filter paper to obtain a front solution of LDH. The front solution was analyzed by ICP-AES to determine its $Li^+$ concentration (about 146±37 ppm) and $Al^{3+}$ concentration (about 185±13 ppm).

Thereafter, the Pd/c-LDH/PSS structure was immersed in the front solution of LDH at 30° C. for 2 hours, then washed with de-ionized water, and then baked. The above steps (e.g. immersion, wash, and bake) were repeated 3 times, and the sample was then calcinated at 400° C. to complete a gas filtration structure c-LDH/Pd/c-LDH/PSS. The gas filtration structure had the only one gas filtration film pair (c-LDH/Pd).

Example 5

The hydrogen permeation rate and $H_2/N_2$ selectivity of the gas filtration structure c-LDH/Pd/c-LDH/PSS (Preparation Example 5) was measured. In a chamber, hydrogen was provided on the c-LDH layer of the gas filtration structure, and the pressure and the temperature of the hydrogen was increased to 4 atm and 400° C., respectively. As such, the hydrogen flux (at 4 atm) of the hydrogen permeating through the gas filtration structure was measured under the PSS of the gas filtration structure by a flow meter. The hydrogen fluxes at different pressures were regression calculated to obtain the hydrogen permeation rate of the hydrogen permeating through the gas filtration structure. Next, the chamber pressure was reduced to ambient pressure, and nitrogen was provided on the c-LDH layer of the gas filtration structure to drive out hydrogen. After the chamber was full of nitrogen, the pressure and the temperature of the nitrogen on the c-LDH layer of the gas filtration structure was increased to 4 atm and 400° C., respectively. As such, the nitrogen flux (at 4 atm) of the nitrogen permeating through the gas filtration structure was measured under the PSS of the gas filtration structure by a flow meter. The gas filtration structure with the only one gas filtration film pair from Preparation Example 5 had a hydrogen permeation rate of 105 $Nm^3/m^2 \cdot hr \cdot atm^{0.5}$ and a $H_2/N_2$ selectivity of 6102.

Preparation Example 6

AlLi intermetallic compound was ground to powder with a particle size of 100 micrometers to 1000 micrometers. The AlLi intermetallic compound has a Li content of about 18 wt % to 21 wt %. The AlLi intermetallic compound powder was put into 100 mL of pure water, which was bubbled by nitrogen and stirred under ambient atmosphere for several minutes, so that most of the AlLi intermetallic compound powder reacted with the water and dissolved in the water. The above solution was filtered by a filter paper (No. 5A) to remove impurities, thereby obtaining a clean alkaline solution containing $Li^+$ and $Al^{3+}$. The alkaline solution had a pH value of about 11.0 to 12.3. The alkaline solution was analyzed by ICP-AES to determine its $Li^+$ concentration (about 146±37 ppm) and $Al^{3+}$ concentration (about 185±13 ppm).

A porous stainless steel (PSS, Pall Accusep Filter, Filter P/N: 7CC6L465236235SC02) was received, and each of the pores of the PSS surface was filled with aluminum oxide particles with an average particle size of 10 micrometers. The PSS filled with the aluminum oxide particles was immersed in the alkaline solution (containing $Li^+$ and $Al^{3+}$) for 1 hour and then dried, such that a lithium-containing aluminum hydroxide layer with a continuous phase, a layered double hydroxide (LDH) structure, and a sufficient thickness was formed on the PSS surface (LDH/PSS). The LDH layer had a thickness of about 3 micrometers. Thereafter, the LDH/PSS was calcinated at 450° C. for 2 hours to form c-LDH/PSS. The PSS having pores filled with the aluminum oxide and wrapped by the c-LDH layer (c-LDH/PSS) may be referred to as a porous support.

Subsequently, a palladium layer was formed on the c-LDH layer in the following steps. The c-LDH/PSS was sequentially immersed in a $SnCl_2$ solution, de-ionized water, a $PdCl_2$ solution, 0.01M HCl, and de-ionized water, and the above steps were repeated until the color of the sample surface changed to brown, signifying that the c-LDH/PSS was activated. The activated c-LDH/PSS was put into a palladium solution to perform electroless plating, thereby forming a palladium layer on the c-LDH to complete a Pd/c-LDH/PSS structure.

1800 mL of de-ionized water was bubbled by nitrogen and stirred to avoid dissolving carbon dioxide in the water. AlLi intermetallic compound was pound, cracked, and then filtered by a sieve mesh (#325, pore size of 45 micrometers). 1.8 g of the filtered AlLi was added to the bubbled de-ionized water, which was then continuously bubbled and stirred for 20 minutes. The un-dissolved powder was filtered out by filter paper to obtain a front solution of LDH. The front solution was analyzed by ICP-AES to determine its $Li^+$ concentration (about 146±37 ppm) and $Al^{3+}$ concentration (about 185±13 ppm).

Thereafter, the Pd/c-LDH/PSS structure was immersed in the front solution of LDH at 30° C. for 2 hours, then washed with de-ionized water, and then baked. The above steps (e.g. immersion, wash, and bake) were repeated 3 times, and the sample was then calcinated at 400° C. to complete a gas filtration structure c-LDH/Pd/c-LDH/PSS.

Subsequently, a palladium layer was formed on the c-LDH layer in the following steps. The c-LDH/Pd/c-LDH/PSS was sequentially immersed in a $SnCl_2$ solution, de-ionized water, a $PdCl_2$ solution, 0.01M HCl, and de-ionized water, and the above steps were repeated until the color of the sample surface changed to brown, signifying that the c-LDH/Pd/c-LDH/PSS was activated. The activated c-LDH/PSS was put into a palladium solution to perform electroless plating, thereby forming a palladium layer on the c-LDH to complete a Pd/c-LDH/Pd/c-LDH/PSS structure.

1800 mL of de-ionized water was bubbled by nitrogen and stirred to avoid dissolving carbon dioxide in the water. AlLi intermetallic compound was pound, cracked, and then filtered by a sieve mesh (#325, pore size of 45 micrometers). 1.8 g of the filtered AlLi was added to the bubbled de-ionized water, which was then continuously bubbled and stirred for 20 minutes. The un-dissolved powder was filtered out by filter paper to obtain a front solution of LDH. The front solution was analyzed by ICP-AES to determine its $Li^+$ concentration (about 146±37 ppm) and $Al^{3+}$ concentration (about 185±13 ppm).

Thereafter, the Pd/c-LDH/Pd/c-LDH/PSS structure was immersed in the front solution of LDH at 30° C. for 2 hours, then washed with de-ionized water, and then baked. The above steps (e.g. immersion, wash, and bake) were repeated 3 times, and the sample was then calcinated at 400° C. to complete a gas filtration structure c-LDH/Pd/c-LDH/Pd/c-LDH/PSS. The gas filtration structure had two gas filtration film pairs (c-LDH/Pd). On the other hand, the palladium layers in the two gas filtration film pairs of Preparation Example 6 had a total thickness of 6.64 micrometers, which is thinner than the palladium layer in the only one gas filtration film pair of Preparation Example 5 (e.g. 8.19 micrometers).

Example 6

The hydrogen permeation rate and $H_2/N_2$ selectivity of the gas filtration structure c-LDH/Pd/c-LDH/Pd/c-LDH/PSS (Preparation Example 6) was measured. In a chamber, hydrogen was provided on the c-LDH layer of the gas filtration structure, and the pressure and the temperature of the hydrogen was increased to 4 atm and 400° C., respectively. As such, the hydrogen flux (at 4 atm) of the hydrogen permeating through the gas filtration structure was measured under the PSS of the gas filtration structure by a flow meter. The hydrogen fluxes at different pressures were regression calculated to obtain the hydrogen permeation rate of the hydrogen permeating through the gas filtration structure. Next, the chamber pressure was reduced to ambient pressure, and nitrogen was provided on the c-LDH layer of the gas filtration structure to drive out hydrogen. After the chamber was full of nitrogen, the pressure and the temperature of the nitrogen on the c-LDH layer of the gas filtration structure was increased to 4 atm and 400° C., respectively. As such, the nitrogen flux (at 4 atm) of the nitrogen permeating through the gas filtration structure was measured under the PSS of the gas filtration structure by a flow meter. The gas filtration structure with the two gas filtration film pairs from Preparation Example 6 had a hydrogen permeation rate of 114 $Nm^3/m^2 \cdot hr \cdot atm^{0.5}$ and a $H_2/N_2$ selectivity of 59254. As shown in the comparison of Examples 5 and 6, the gas filtration structure with more gas filtration film pairs could dramatically increase the $H_2/N_2$ selectivity of the gas filtration structure in the condition of reducing the thickness of the palladium layer. It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A gas filtration structure, comprising:
    a porous support; and
    a first gas filtration film pair on the porous support,
    wherein the first gas filtration film pair includes:
    a first hydrogen permeation layer and a first calcinated layered double hydroxide (c-LDH) layer, wherein the first hydrogen permeation layer is disposed between the porous support and the first calcinated layered double hydroxide (c-LDH) layer,
    wherein the layered double hydroxide has a chemical structure of
    $[M^{II}_{1-x}M^{III}_x(OH)_2]A^{n-}_{x/n} \cdot mH_2O$,
    wherein $M^{II}$ is $Mg^{2+}$, $Zn^{2+}$, $Fe^{2+}$, $Ni^{2+}$, $Co^{2+}$, or $Cu^{2+}$; $M^{III}$ is $Al^{3+}$, $Cr^{3+}$, $Fe^{3+}$, or $Sc^{3+}$;
    $A^{n-}$ is $CO_3^{2-}$, $Cl^-$, $NO_3^-$, $SO_4^{2-}$, $PO_4^{3-}$, or $C_6H_4(COO^-)_2$; and
    x is 0.2 to 0.33.

2. The gas filtration structure as claimed in claim 1, wherein the porous support comprises stainless steel, ceramic, or glass.

3. The gas filtration structure as claimed in claim 1, wherein the porous support has pores filled with filling particles, the porous support has a surface modified by another c-LDH layer, or a combination thereof.

4. The gas filtration structure as claimed in claim 1, wherein the first hydrogen permeation layer comprises palladium, silver, copper, gold, nickel, platinum, aluminum, gallium, indium, thallium, germanium, tin, lead, antimony, bismuth, or a combination thereof.

5. The gas filtration structure as claimed in claim 1, wherein the first hydrogen permeation layer has a thickness of 1 micrometer to 20 micrometers.

6. The gas filtration structure as claimed in claim 1, wherein part or all of $M^{II}$ is replaced with $Li^+$.

7. The gas filtration structure as claimed in claim 1, wherein the first c-LDH layer has a thickness of 1 micrometer to 50 micrometers and an interlayer spacing of 2.89 Å to 3.64 Å.

8. The gas filtration structure as claimed in claim 1, wherein the first c-LDH layer comprises $CO_3^{2-}$ functional group.

9. The gas filtration structure as claimed in claim 1, further comprising a second gas filtration film pair on the first gas filtration film pair, wherein the second gas filtration film pair includes a second hydrogen permeation layer and a second c-LDH layer, and the second hydrogen permeation layer is disposed between the first c-LDH layer and the second c-LDH layer.

10. The gas filtration structure as claimed in claim 9, wherein the first hydrogen permeation layer and the second hydrogen permeation layer have a total thickness of 1 micrometer to 16 micrometers.

11. A method for filtering gas, comprising:
    providing a gas filtration structure, wherein the gas filtration structure includes:
    a porous support; and
    a first gas filtration film pair on the porous support,
    wherein the first gas filtration film pair includes a first hydrogen permeation layer and a first c-LDH layer, and the first hydrogen permeation layer is disposed between the porous support and the first c-LDH layer, providing a hydrogen-containing mixture gas on the first gas filtration film pair; and collecting hydrogen under the porous support, wherein the layered double hydroxide has a chemical structure of $[M^{II}{}_{1-x}M^{III}{}_x(OH)_2]A^{n-}{}_{x/n} \cdot mH_2O$, wherein $M^{II}$ is $Mg^{2+}$, $Zn^{2+}$, $Fe^{2+}$, $Ni^{2+}$, $Co^{2+}$, or $Cu^{2+}$;

$M^{III}$ is $Al^{3+}$, $Cr^{3+}$, $Fe^{3+}$, or $Sc^{3+}$;

$A^{n-}$ is $CO_3^{2-}$, $Cl^-$, $NO_3^-$, $SO_4^{2-}$, $PO_4^{3-}$, or $C_6H_4(COO^-)_2$; and x is 0.2 to 0.33.

12. The method as claimed in claim 11, wherein the hydrogen sequentially permeates through the first c-LDH layer, the first hydrogen permeation layer, and the porous support.

13. The method as claimed in claim 11, wherein the formation of the first c-LDH layer includes:

forming a layered double hydroxide on the first hydrogen permeation layer;

heating the layered double hydroxide to 300° C. to 500° C., thereby forming the first c-LDH layer.

14. The method as claimed in claim 11, wherein the gas filtration structure further includes a second gas filtration film pair on the first gas filtration film pair, wherein the second gas filtration film pair includes a second hydrogen permeation layer and a second c-LDH layer, and the second hydrogen permeation layer is disposed between the first c-LDH layer and the second c-LDH layer.

15. The method as claimed in claim 14, wherein the hydrogen sequentially permeates through the second c-LDH layer, the second hydrogen permeation layer, the first c-LDH layer, the first hydrogen permeation layer, and the porous support.

* * * * *